United States Patent

[11] 3,600,520

[72] Inventor Norman Arthur Slark
Essex, England
[21] Appl. No. 744,351
[22] Filed July 12, 1968
[45] Patented Aug. 17, 1971
[73] Assignee English Electric Valve Company Limited
London, England
[32] Priority Aug. 4, 1967
[33] Great Britain
[31] 35,992/67

[54] LADENT IMAGE DISCHARGE FOR VIDEO CAMERA TUBE

9 Claims, 1 Drawing Fig.

[52] U.S. Cl. .......... 178/7.2, 315/10
[51] Int. Cl. .......... H04n 5/26
[50] Field of Search .......... 172/7.2 D, 7.2; 315/10, 11

[56] References Cited

UNITED STATES PATENTS

| | | | |
|---|---|---|---|
| 2,765,422 | 10/1956 | Henderson | 315/11 |
| 2,853,648 | 9/1958 | Theile | 315/11 |
| 2,992,358 | 7/1961 | Farnsworth | 315/11 |

*Primary Examiner*—Robert L. Griffin
*Assistant Examiner*—Richard P. Lange
*Attorney*—Baldwin, Wight & Brown

ABSTRACT: In a storage television camera tube, the photocathode is subjected to flood lighting during selected blanking intervals. A large amount of charge is thus produced on the screen and the screen is scanned to remove this charge so that only a negligibly small amount of charge remains. In this way optical images may be produced on the screen and read off in a short period, and a second image may be produced, without leaving a noticeable amount of charge on the cathode from the first image.

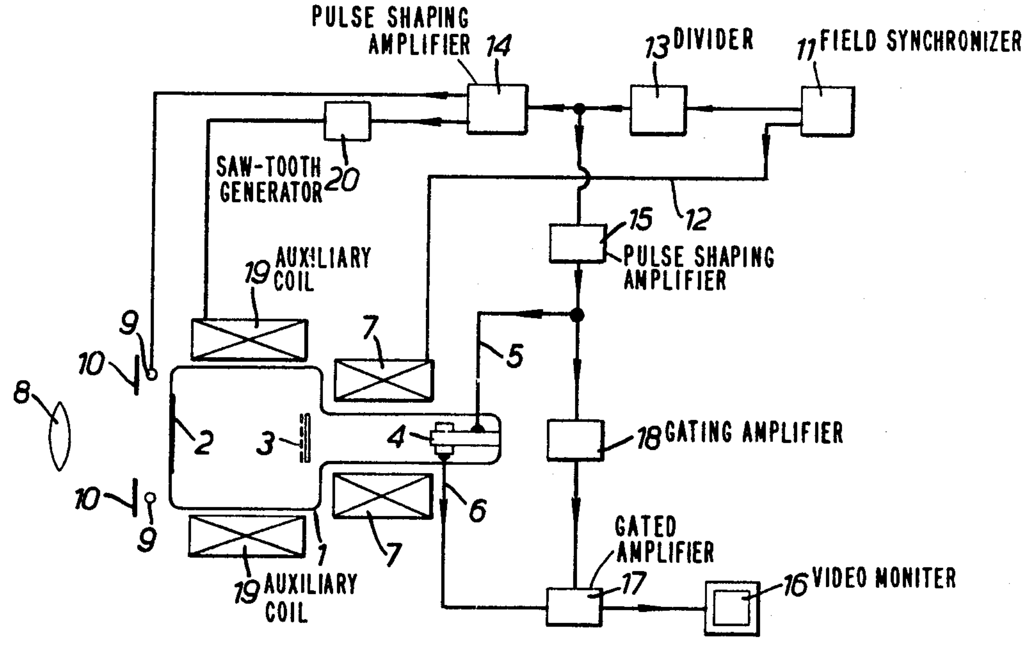
INVENTOR
Norman Arthur Slark
BY
Baldwin Wight Diller & Brown
ATTORNEYS

LADENT IMAGE DISCHARGE FOR VIDEO CAMERA TUBE

This invention relates to television and like cameras and more particularly to cameras including storage-type television camera tubes such as Image Orthicons, Image Isocons and Vidicons, i.e. camera tubes in which an e electrical charge image corresponding to an optical image "viewed" by the tube is built up and scanned by a cathode-ray to develop video signals representative of the optical image. Camera tubes of this kind are, of course, very well known and require no detailed description here.

A phenomenon which is exhibited by storage-type television camera tubes is that, when the optical image light on the image-receiving photocathode of the tube is of a low level and short time persistence, a single cathode ray scan of the charge-storing target of the tube, effected when the light image has ceased, is insufficient to collect fully all the charges in the electrical charge image produced on said target and, after such a scan, there is a "remnant" charge image still on the target. Indeed at low light levels, a "remnant" charge image may remain after several successive scannings effected after the light image has ceased, video signal outputs of successive cathode-ray scans being of successively diminished amplitudes. In fact if a low light level optical image is momentarily projected onto the photocathode of the tube and the target is then repeatedly scanned by the cathode-ray to develop video signals, small "remnants" of the electrical charge image produced by the optical image may be sometimes observed in the output video signals as long as 2 seconds after the optical image has ceased though, of course, by that time they are very small indeed. This phenomenon is particularly noticeable with camera tubes, such as Image Orthicons, Image Isocons and Vidicons, which operate on the well-known cathode potential stabilization principle, for with such tubes the efficiency of "readout" is very critically dependent on the amount of charge stored by the target.

This phenomenon is a serious defect in those many cases in which it is required to expose the camera tube to an optical image for a short period, subsequently "readout" the stored image in one or two frames, (for example to store it in some way as by photographing a picture reproduced by a monitor fed by the video signals obtained during "readout"), then expose the tube to a fresh optical image for a short period, "readout" the electrical charge image corresponding to this fresh optical image ——and so on. As will be apparent the result of the above described phenomenon is that a "remnant" charge image, remaining after a "readout" operation, is still present when the next optical image is projected on to the tube so that the charge image on the target w hen the said next optical image ceases is not truly representative of said next optical image but includes also "remnant" charges from the preceding image.

The present invention seeks to overcome these difficulties and to provide improved cameras which will give satisfactory results when exposed to successive optical images which are of low light intensity and low time persistence and are required to be "readout" quickly i.e. in only one or two scans of the scanning cathode-ray tube.

According to this invention in a television camera apparatus, there is provided a storage-type cathode-ray tube having a target means and a photocathode, means for subjecting said photocathode to a relatively high-intensity flood lighting during predetermined selected blanking intervals, the target means becoming relatively positive; means for effecting cathode-ray scanning of said tube to discharge relatively large electrical charges produced on the target means of said tube as a result of the flood lighting whereby charges remaining on said target means becomes negligibly small and the tube becomes ready to receive an optical image of a subject to the translated into video signals; and means for gating off a video channel fed with an output from said tube during periods in which said output has signals thereon resulting from the scanning to discharge the relatively large electrical charges produced as a result of the flood lighting.

In a preferred way of carrying out the invention the target of the tube is scanned in a television raster by the cathode-ray thereof and the photocathode of said tube is flood lit during selected spaced field-blanking intervals, charges thus produced on the target of said tube being collected by effecting scanning of said target in one or a few fields immediately following each flood lighting and a few fields before the next flood lighting. Thus the tube may be flood lit during each fifth blanking interval, and collection of the resultant charges effected by cathode-ray scanning with a relatively strong cathode-ray during the next two field periods.

The flood lighting of the photocathode energized by conveniently obtained by electric discharge light source means arranged near the photocathode and out of the 67b97 paths over which desired optical images are projected on to said photocathode. Thus there may be a plurality of electrical discharge lamps arranged round the photocathode end of the tube behind a reflector positioned to cause the light from said lamps to flood light said photocathode.

In one arrangement the lamps are energized by a pulse energizing source controlled by the normally provided field synchronizing signals of the camera through a frequency divider the output of which is also utilized, via a pulse-stretching circuit, to "brighten up" the cathode-ray in the tube for a predetermined number (for example two) of frames following each short period of lamp energization.

Means are provided for gating a video signal channel off fed with output signals from the tube during periods in which said output signals are signals corresponding to flood lighting of the photocathode. Thus in the above described embodiment in which signals from a frequency divider are utilized via a pulse-stretching circuit to "brighten up' the cathode-ray the "-brighten up" signals may also be utilized to close a gate in the said video signal channel.

The invention is illustrated in the accompanying drawing which shows, in much simplified block diagrammatic manner, one embodiment thereof.

Referring to the drawing, 1 is a television camera tube of any suitable kind known per se. It may be, for example, an Image Isocon. Because it is well known it is not fully shown, only the photocathode 2, storage target structure 3, cathode-ray gun and output electrode structure 4, gun control grid lead 5 ad video signal output lead 6 being indicated. The tube has the customary electromagnet-scanning coil system 7 and the camera of which the tube forms part includes the customary image-focusing optical system represented by the lens 8. In addition four neon gas discharge lamps 9 (of which only two are shown in the figure) are provided near the photocathode end of the tube. They are spaced at 90° round the tube well outwardly of the optical image light paths to the photocathode 2, and a suitable reflector screen 10, painted white on the side facing the said photocathode 2, is provided as indicated, so that when the said lamps are alight they flood light the photocathode with an intensity sufficient to raise the charges stored by the target 3 above the "knee" of the Image Isocon tube characteristic curve connecting light illumination of the photocathode with electric charge on the target 3, which becomes relatively more positive than its potential prior to flood lighting.

Television raster scanning, e.g. interlaced scanning at 25 fields(25 frames) per second is obtained in the customary way by suitably synchronized line and field coil driving unit of which only the field coil unit is also by the block 11 which is presumed to contain also the field synchronizing source providing pulses at (in the example assumed) 50 per second. The field drive to the field coil in the coil system 7 is fed thereto over the lead 12 and field synchronizing signals from unit 11 are fed to a divider 13 which provides output pulses at some convenient frequency. In the present example these pulses are at 5 per second, the divider 13 having a dividing factor of 10. Output from the divider 13 is fed to a pulse-shaping amplifier 14 the output pulses from which are narrow and of an amplitude sufficient to energize the lamp 9 to flood light the photocathode 2 to the required intensity above set forth. The pulses fed to the lamps 9 occur in every fifth field-blanking period and are slightly shorter than that period. They may, for example, be about 1 millisecond long.

Output pulses from the divider 13 are also fed to a pulse stretching and shaping amplifier 15 of any convenient form known per se which produces, in response to input pulses thereto, output pulses which may be, for example, one field period long i.e. to give a practical figure, about 40 millisecs. long. These pulses are fed to the control grid (not separately shown31 ) in the cathode-ray gun included in the structure 4 and are of the correct polarity and amplitude to "brighten up" the cathode-ray to cause it to discharge and thus nullify the substantially uniform strong charge which were put on the target 3 as a result of the immediately preceding illumination of the photocathode 2 by the flashing of the lamps 9.

16 is the customary picture-reproducing monitor for displaying video output signals appearing on the output lead 6 of the tube 1. These signals will, of course, include video signals resulting from the short flood lighting periods of the photocathode 2. In order to prevent these signals from being displayed by the monitor 16 the video signals from 6 are fed to the said monitor 16 through a gated amplifier 17 a stage in which is cut off, during the presence of the video signals which are not to be displayed, by gating potential supplied by a gating amplifier 18 controlled by output from the unit 15.

With this arrangement each useful video-signal-producing scanning of the target 3 by the gun in the structure 4 is followed by short uniform light illumination of the photocathode 2 by the lamps 9 which are energized during each fifth field-blanking period. Then follow one field period in which the charges produced on the target 3 due to the "flashing" of the lamps 9 are collected, the video signals to the monitor 16 being cut off during this time so that no "flashing" appears on the monitor. At the end of this time the target will be substantially free of charges and ready to receive charges representative of the subject "viewed." The cycle of operations then repeats.

If the optical image is a relatively moving one e.g. if the camera tube is carried by a moving vehicle "viewing" a terrain across which it is moving, it may be desired to hold the "view" in effect stationary during each period in which the photocathode 2 is scanned to produce useful video signals. If this result is desired it may be achieved by feeding to an auxiliary motion —compensating coil system 19 a suitably directed auxiliary component of deflection such that the effect of optical image motion across the photocathode 2 is cancelled out (so far as video output signals from the tube are concerned) by the effect of the auxiliary component of deflection. The figure illustrates a suitable arrangement for this purpose. As shown the compensating auxiliary component of deflection is provided by a current sawtooth generator 20, triggered by triggering pulses of suitable form and duration provided by suitable additional pulse-shaping circuitry of any convenient known form in the unit 14, and occurring at the frequency (5 per second) of the output from the divider 13.

The pictures produced on the monitor can be utilized in any convenient way e.g. photographed by a cinematograph camera controlled by output from the divider 13 (i.e. in the example above described, operated to take 5 photographs per second) so that each successive picture produced by each successive useful video-signal-producing scanning operation of the target 3, is photographed on a successive frame of the cinematograph camera.

I claim:

1. In a television camera apparatus, a storage-type cathode-ray tube having a target means and a photocathode, means for subjecting said photocathode to a relatively high-intensity flood lighting during predetermined selected blanking intervals, the target means becoming relatively positive; means for effecting cathode-ray scanning in said tube to discharge relatively large electrical charges produced on the target means of said tube as a result of the flood lighting whereby charges remaining on said target means become negligibly small and the tube becomes ready to receive an optical image of a subject to be translated into video signals; and means for gating off a video channel fed with an output from said tube during periods in which said output has signals thereon resulting from scanning to discharge the relatively large electrical charges produced as a result of the flood lighting.

2. The apparatus as claimed in claim 1 including means for scanning said target in a television raster by the cathode-ray thereof, and wherein said means for subjecting said photocathode to high-intensity flood lighting during predetermined selected blanking intervals comprise means for subjecting said photocathode to flood lighting during selected spaced field-blanking intervals, and wherein said means for effecting cathode-ray scanning in said tube to discharge relatively large electrical charges produced on the target means as a result of said flood lighting comprise means for effecting cathode-ray scanning during one or more fields immediately following each flood lighting and a few fields before the next flood lighting.

3. The apparatus as claimed in claim 2 wherein said means for subjecting said photocathode to flood lighting during selected spaced field-blanking intervals comprise means for subjecting said photocathode to flood lighting during each fifth blanking interval, and wherein said means for effecting cathode-ray scanning during one or more fields immediately following each flood lighting comprise means for effecting cathode-ray scanning during the next field with a strong cathode-ray.

4. The apparatus as claimed in claim 1 wherein said means for subjecting said photocathode to a relatively high-intensity flood lighting comprise light source means arranged near the photocathode and out of light paths over which desired optical images are projected on to said photocathode.

5. The apparatus as claimed in claim 4 wherein said light source means comprise a plurality of electrical discharge lamps arranged round the photocathode end of the tube behind a reflector positioned to cause light from said lamps to flood light said photocathode.

6. The apparatus as claimed in claim 4 including a frequency divider having an input from a source of field-synchronizing signals and first and second outputs, a pulse-energizing source receiving the first output for energizing said light source means, and a pulse-stretching circuit means receiving said second output for brightening the cathode-ray in the tube for a predetermined number of frames following each period of light source means energization.

7. The apparatus as claimed in claim 6 wherein said means for gating a video channel comprise gate means responsive to said output for brightening the cathode-ray.

8. The apparatus as claimed in claim 1 wherein said means for subjecting said photocathode to a relatively high-intensity flood lighting are effective to raise charges stored by said target above the knee of the characteristic curve of the tube.

9. The apparatus as claimed in claim 1 wherein said tube is an Image Orthicon, Image Isocon or Vidicon.